(12) United States Patent
Kirsch et al.

(10) Patent No.: US 8,519,837 B2
(45) Date of Patent: Aug. 27, 2013

(54) DRIVER ASSISTANCE DEVICE FOR A VEHICLE AND A METHOD FOR VISUALIZING THE SURROUNDINGS OF A VEHICLE

(75) Inventors: Oliver Kirsch, Wuppertal (DE); Frank Schliep, Leverkusen (DE)

(73) Assignee: Johnson Controls GmbH, Burscheid (DE)

( * ) Notice: Subject to any disclaimer, the term of this patent is extended or adjusted under 35 U.S.C. 154(b) by 858 days.

(21) Appl. No.: 12/066,073

(22) PCT Filed: Sep. 6, 2006

(86) PCT No.: PCT/EP2006/008776
§ 371 (c)(1),
(2), (4) Date: Sep. 5, 2008

(87) PCT Pub. No.: WO2007/028630
PCT Pub. Date: Mar. 15, 2007

(65) Prior Publication Data
US 2008/0316011 A1 Dec. 25, 2008

(30) Foreign Application Priority Data

Sep. 8, 2005 (DE) .......................... 10 2005 042 912
Sep. 8, 2005 (DE) .......................... 10 2005 042 913

(51) Int. Cl.
*B60Q 1/00* (2006.01)
(52) U.S. Cl.
USPC ........ 340/438; 340/901; 340/905; 340/425.5; 340/435; 701/301; 345/7

(58) Field of Classification Search
USPC ...... 340/901, 905, 425.5, 435, 438; 701/301; 345/7
See application file for complete search history.

(56) References Cited

U.S. PATENT DOCUMENTS

| 5,001,558 | A  | * | 3/1991  | Burley et al. .............. 348/164 |
| 5,963,148 | A  | * | 10/1999 | Sekine et al. .............. 340/905 |
| 6,281,806 | B1 | * | 8/2001  | Smith et al. ................ 340/901 |
| 6,327,536 | B1 | * | 12/2001 | Tsuji et al. .................. 701/301 |
| 6,429,789 | B1 |   | 8/2002  | Kiridena et al.                    |
| 6,690,268 | B2 | * | 2/2004  | Schofield et al. ............ 340/438 |
| 7,312,725 | B2 | * | 12/2007 | Berson et al. ................ 340/980 |
| 7,400,266 | B2 | * | 7/2008  | Haug ............................ 340/903 |

(Continued)

FOREIGN PATENT DOCUMENTS

| DE | 100 16 184 A1 | 10/2001 |
| DE | 102 20 825 A1 | 7/2003 |

(Continued)

OTHER PUBLICATIONS

International Search Report dated Feb. 8, 2007 as received in corresponding PCT Application No. PCT/EP2006/008776, 4 pages.

*Primary Examiner* — Jennifer Mehmood
*Assistant Examiner* — Andrew Bee
(74) *Attorney, Agent, or Firm* — Foley & Lardner LLP

(57) ABSTRACT

The invention relates to a driver assistance device for a vehicle and a method for visualizing the environment of the vehicle. Said driver assistance device is associated with two sensors for detecting the environment of the vehicle. The sensors have a different resolution and/or the driver assistance device is associated with a display device. Said display device is arranged in the region of the front disk in order to restrict analogic contact on the display which represents attentiveness information.

22 Claims, 1 Drawing Sheet

(56) References Cited

U.S. PATENT DOCUMENTS

Figure 1:
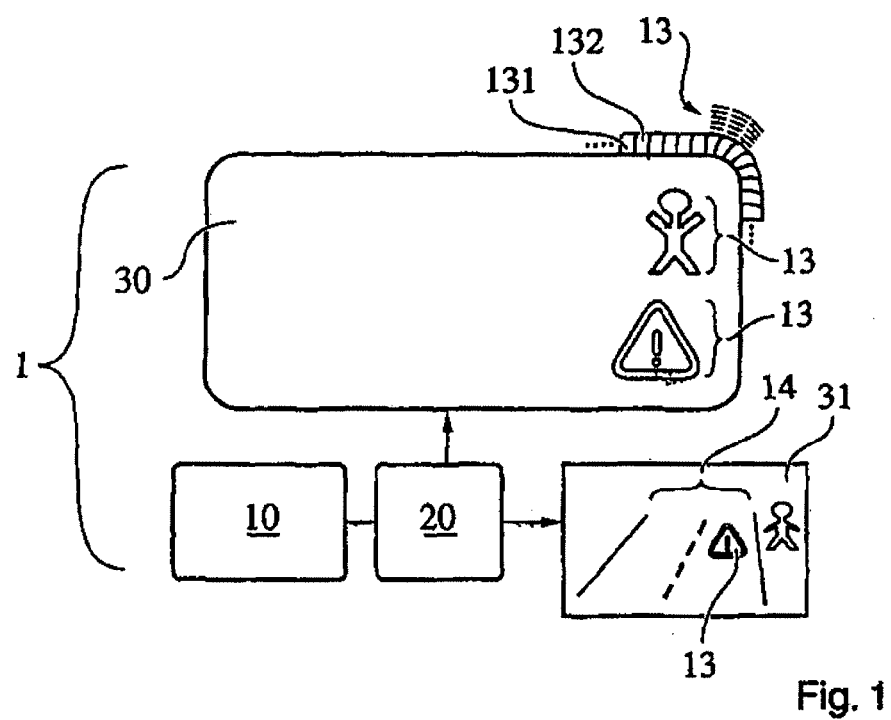

| | | | |
|---|---|---|---|
| 7,543,677 B2 * | 6/2009 | Igawa | 180/274 |
| 2002/0140562 A1 * | 10/2002 | Gutta et al. | 340/576 |
| 2003/0001093 A1 * | 1/2003 | Wood | 250/332 |
| 2004/0136605 A1 * | 7/2004 | Seger et al. | 382/274 |
| 2005/0029456 A1 * | 2/2005 | Eggers et al. | 250/339.02 |
| 2005/0110621 A1 * | 5/2005 | Hahn et al. | 340/435 |
| 2005/0134479 A1 * | 6/2005 | Isaji et al. | 340/901 |
| 2005/0232469 A1 * | 10/2005 | Schofield et al. | 382/104 |
| 2005/0278098 A1 * | 12/2005 | Breed | 701/45 |
| 2006/0043296 A1 * | 3/2006 | Mian et al. | 250/330 |
| 2006/0164219 A1 * | 7/2006 | Knoll | 340/435 |
| 2006/0164230 A1 * | 7/2006 | DeWind et al. | 340/461 |
| 2006/0268115 A1 * | 11/2006 | Eggers et al. | 348/207.99 |

FOREIGN PATENT DOCUMENTS

| | | |
|---|---|---|
| DE | 102 18 175 A1 | 11/2003 |
| DE | 102 54 806 A1 | 6/2004 |
| EP | 0 963 923 A2 | 12/1999 |

* cited by examiner

DRIVER ASSISTANCE DEVICE FOR A VEHICLE AND A METHOD FOR VISUALIZING THE SURROUNDINGS OF A VEHICLE

This application is a national phase application under 35 U.S.C. §371 of PCT/EP2006/008776 filed Sep. 8, 2006, which claims priority from DE application number 10 2005 042 913.0 filed Sep. 8, 2005 and DE application number 10 2005 042 912.2, filed Sep. 8, 2005.

The present invention relates to a driver assistance device for a vehicle. Such driver assistance devices are generally known. For example, German laid-open patent application DE 100 16 184 A1 has disclosed a device for displaying the surroundings of a vehicle in which image data is projected onto a windshield which functions as a screen. In such a system it is disadvantageous that what is referred to as completely contact-analogous display on the windshield or front windshield is either extremely complicated and therefore costly or else does not occur in all the areas with a 1:1 congruence between the camera image and the real world on the windshield. Furthermore, for example, German laid-open patent application DE 102 18 175 A1 discloses a device for displaying the surroundings of a vehicle in which two sensors are provided and their image data is merged in order to be displayed to the driver. It is disadvantageous in this context that sensors or cameras which, on the one hand, have a comparatively high resolution (comparable to the resolution which is customary to cameras or sensors which are sensitive to light in the visible range of the spectrum) are sensitive, in particular, in the (far) infrared range of the spectrum and are very costly.

The object of the present invention is to provide a driver assistance device for a vehicle with which with simple means which can be made available cost-effectively it is possible to ensure that an indication of the important and safety-critical information about the surroundings of the vehicle is provided to the driver efficiently with as little information overload as possible.

According to a first embodiment of the invention, the object is achieved by a driver assistance device for a vehicle, wherein two sensors for sensing the surroundings of the vehicle are assigned to the driver assistance device, wherein the sensors have different resolutions. As a result it is advantageously possible according to the invention for a considerably better method of functioning of the driver assistance device to be made possible by means of the evaluation of two sensors. The driver assistance device according to the invention in accordance with the first embodiment is, furthermore, also capable of being manufactured comparatively cost-effectively because a comparatively low resolution can be selected for one of the sensors. The at least two sensors are preferably provided for sensing in different spectral ranges so that according to the invention it is advantageously possible to evaluate more information which is actually present in the surroundings of the vehicle in order in this way to arrive at a more precise information basis, either for evaluation by the driver assistance device or in order to provide information to the driver. It is preferred, in particular, that the first sensor is provided for sensing in the range of visible light, and that the second sensor is provided for sensing in the range of infrared light, preferably in the range of far infrared. Alternatively, it is, of course, possible for the second sensor to be sensitive in the near infrared range or else both in the near and far infrared ranges. As a further alternative to this it is possible for the first sensor to be sensitive both in the visible range of the spectrum and in the near infrared range. In this way it is also possible for there to be a certain overlapping part of the sensed spectral ranges of the two sensors. However, according to the invention, it is also possible for the detected spectral ranges not to overlap. An advantage of simultaneous sensing in the visible and infrared spectral ranges, which is possible by means of the at least two sensors, is that it is therefore possible to make a considerably larger quantity of information accessible to the driver assistance device or to the driver, which has the significant effect of increasing the safety of occupants of the vehicle and of other road users. By means of the inventive measures according to the first embodiment it is advantageously possible for particularly precise sensing, which takes into account all the possible information channels and spectral ranges, to be carried out. It is very particularly preferred to use the driver assistance device at night, at which time the evaluation of infrared signals, emitted for example by pedestrians moving next to the roadway or else by animals, constitutes a particular gain in information which is not accessible to the driver in a normal situation without a driver assistance device.

It is preferred in particular according to the first embodiment that the second sensor has a lower resolution than the first sensor. As a result, the second sensor can be manufactured particularly cost-effectively.

According to the invention, in accordance with the first embodiment it is also preferred that a display device is assigned to the driver assistance device. As a result it is possible to use simple means to display the information acquired by means of the sensors in a way which is accessible to a driver. In this context the display device can, according to the invention, be provided in the region of the front windshield and/or in the region of the cockpit of the vehicle and/or in the region of the center console of the vehicle. If the display is provided at a plurality of locations, there are, of course, in particular two different display devices, but in this case the driver assistance device supplies information for both of these display devices. By selecting these locations for the display device which are preferred according to the invention it is possible, in a particularly efficient way, to provide the driver, or generally a user of the driver assistance device, with information about critical driving states or situations. In the region of the front windshield, the display device is preferably provided as a headup display. As a result, the driver can advantageously be provided with information without turning his head or diverting his attention from the events on the road. As a result it is particularly advantageously possible for the driver's attention to be directed in the correct direction. As a result it may also advantageously become possible to project the information to be displayed into the region of the front windshield or into a region which is behind the front windshield (virtual image) viewed from the driver so that the information which is to be displayed can be displayed in a particularly precisely localized fashion.

According to the invention, in accordance with the first embodiment it is also preferred that the display device is provided for displaying attentiveness information and/or for displaying a graphic representation of at least part of the surroundings of the vehicle. Attentiveness information is understood here to mean within the scope of the present invention a display which is not image information within the sense of a real image which has been taken, for example, by a camera. Attentiveness information within the sense of the present invention may be, for example, a luminous marking, a luminous point or a luminous bar or else a cartoon-like display. A graphic representation is understood within the scope of the present invention to be a display in which the image information is displayed essentially in the form in which it is taken by a camera or a sensor, i.e. with different intensity values, detected by the sensors or cameras, within the image. In this context, the graphic representation and the attentiveness information may be displayed in superimposed fashion, for example. By displaying the attentiveness information or the graphic representation it is advantageously possible for the information to be displayed in a particularly precise way. In particular it is advantageously possible that in the case of representation in incorrect colors, in particular of the infrared sensor signal which originates from the second sensor (or camera), a brightly colored (that is to say multicolored) display of the sensor signals takes place.

In addition, it is preferred that the attentiveness information is a display which is projected into the region of the front windshield, in particular a luminous marking and/or a cartoon-like display. This has the advantage that as a result information can be displayed in a particularly conspicuous way which the driver can recognize so that despite, for example, a display on the front windshield of the vehicle the driver does not suffer an information overload because the projected display is not a realistic reproduction or a realistic image of the object whose presence or whose distance from the vehicle which is critical for safety is to be indicated by the attentiveness information.

Furthermore it is advantageous that, in order to extract the attentiveness information, there is provision for data which is supplied by a sensor of the at least two sensors to be processed, or that, in order to extract the attentiveness information, there is provision for data which is supplied by the at least two sensors to be merged. In this context there is provision according to the invention that a detection step or a processing step is carried out in which the information which is picked up by the sensors or the cameras is interpreted or evaluated.

In addition, according to the invention it is preferred that the attentiveness information comprises distance information and that the attentiveness information is a luminous marking in the peripheral region of the front windshield. As a result it is possible for further important and, if appropriate, safety-related information, in particular relating to the distance from objects, to be made available to the driver, and furthermore it is advantageously possible that a display device can be implemented in a particularly simple and particularly cost-effective way, wherein in particular the edge region of the display or the edge region of the front windshield which requires particular attentiveness of the driver is marked particularly.

According to the invention it is also preferred that there is provision for the attentiveness information to be displayed in a restrictedly contact-analogous fashion in the region of the front windshield. Within the scope of the present invention, the term contact-analogous display means that there is a correlation between the location of the display and the location on the windshield or the front windshield at which a driver of the vehicle would see a detail of the image of the surroundings of the vehicle. Such attentiveness information is displayed according to the invention in a restrictedly contact-analogous display when information is displayed in the region of the front windshield. This means that there is a certain spatial correlation between the location of the display of the attentiveness information and the viewing direction from the point of view of the driver which corresponds to the underlying object, for example a pedestrian, which is detected by the driver assistance device; but according to the invention there is no 1:1 congruence because the attentiveness information is in fact not an image. According to the invention this has the advantage that the driver assistance device can be manufactured particularly easily and cost-effectively and, furthermore, requires very little installation space in a vehicle, which also facilitates the construction of the vehicle and reduces costs.

Furthermore, according to the invention there is preferably provision that a device for determining the position of the driver's head and/or the position of the driver's eyes and/or the movement of the driver's eyes and/or driver's eyelids is assigned to the driver assistance device, and that the location of the attentiveness information and/or of the graphic representation is dependent on the position of the driver's head. This ensures that the attentiveness information and/or the graphic representation is displayed in a particularly precisely positioned fashion on the display device, i.e. for example in the region of the front windshield, and that as a result an information overload of the driver can be efficiently reduced. The risk to the user of falling asleep can therefore be greatly reduced.

In addition it is preferred that the graphic representation corresponds to the display of data which is supplied by one sensor of the at least two sensors, or that the graphic representation corresponds to a merged display of data which is supplied by the at least two sensors. As a result, the information which is to be displayed can be detected and processed particularly easily by a user or driver.

Furthermore, according to the invention it is preferred that the graphic representation comprises a representation in incorrect colors, and wherein in particular the representation in incorrect colors is due to the second sensor. As a result it is advantageous that images can be improved by the representation in incorrect colors by virtue of the fact that, for example, a threshold value behavior is implemented, for example by means of the use of two brightly colored representations.

A further subject matter of the present invention is a method for visualizing the surroundings of a vehicle, wherein at least two sensors sense the surroundings of the vehicle in order to generate attentiveness information, wherein a driver assistance device according to the invention is used. As a result it is advantageously possible for the driver's safety to be greatly improved using simple means.

Furthermore, the object is achieved in accordance with a second embodiment of the invention by a driver assistance device for a vehicle, wherein a display device is assigned to the driver assistance device, wherein the display device is provided in the region of the front windshield in order to display attentiveness information in a restrictedly contact-analogous fashion. Within the scope of the present invention, the term contact-analogous display means that there is a correlation between the location of the display and the location on the windshield or the front windshield at which a driver of the vehicle would see a detail of the image of the surroundings of the vehicle. Attentiveness information is understood within the scope of the present invention to mean a display which is not image information within the sense of a real image which is taken, for example, by a camera. Attentiveness information within the sense of the present invention can be, for example, a luminous marking, a luminous spot or a luminous bar or else a cartoon-like display. According to the invention, such attentiveness information is displayed in a restrictedly contact-analogous display in the region of the front windshield. This means that there is a certain spatial correlation between the location of the display of the attentiveness information and the viewing direction from the point of view of the driver, which corresponds to the underlying object, for example a pedestrian, which is detected by the driver assistance device; however according to the invention there is no 1:1 congruence because in fact the attentiveness information is not an image.

According to the invention this has the advantage that the driver assistance device can be manufactured particularly easily and cost-effectively, and furthermore requires very little installation space in a vehicle, which also facilitates the construction of the vehicle and reduces costs.

It is preferred that two sensors for sensing the surroundings of the vehicle are assigned to the driver assistance device, wherein there is provision for data which is supplied by the two sensors to be merged in order to extract the attentiveness information. As a result, it is possible according to the invention for a considerably better method of functioning of the driver assistance device to be made possible through the evaluation of two sensors.

In addition it is preferred that the attentiveness information is a display which is projected into the region of the front windshield, in particular a luminous marking and/or a cartoon-like display. As a result it is particularly advantageously possible that the driver's attention is directed in the correct direction and nevertheless the driver does not suffer an information overload because the projected display is not a realistic reproduction or a realistic image of the object whose presence or whose distance from the vehicle which is critical for safety is to be displayed by means of the attentiveness information.

According to the invention it is also preferred that the attentiveness information is a luminous marking in the peripheral region of the front windshield. As a result it is possible to implement a display device in a particularly simple way and particularly cost-effectively, with, in particular, the edge region of the display or the edge region of the front windshield which requires particular attention on the part of the driver being marked particularly.

According to the invention it is also preferred that the display device is a headup display. As a result the attentiveness information can be projected into the region of the front windshield or into a region behind the front windshield (virtual image) viewed from the driver's point of view so that the attentiveness information can be displayed in a particularly precisely localized fashion.

According to the invention it is also preferred that a device for determining the position of the driver's head and/or the position of the driver's eyes and/or the movement of the driver's eyes and/or eyelids is assigned to the driver assistance device, and that the location of the attentiveness information is dependent on the position of the driver's head. This ensures that the attentiveness information is displayed in a particularly precisely positioned fashion in the region of the front windshield, and that as a result an information overload of the driver can be efficiently reduced. The risk to the user of falling asleep can therefore be greatly reduced.

In addition it is preferred that the attentiveness information comprises distance information, and/or that the at least two sensors are provided for sensing in different spectral ranges, in particular in the range of visible light and/or in the far infrared range (FIR) and/or in the near infrared range (NIR). As a result it is possible, on the one hand, for further important and, if appropriate, safety-related information, in particular relating to the distance from objects, to be made available to the driver, and that furthermore the attentiveness information is generated on the basis of particularly precise sensing which evaluates all the possible information channels or spectral ranges. It is quite particularly preferred to use the driver assistance device at night, at which time the evaluation of infrared signals, emitted for example by pedestrians moving next to the roadway, or else by animals, constitutes a particular gain in information which is not accessible to the driver in a normal situation without a driver assistance device.

Furthermore, according to the invention it is preferred that an additional display is assigned to the driver assistance device, wherein the additional display is provided for displaying a graphic representation of at least part of the surroundings of the vehicle, and/or it is preferred that the graphic representation corresponds to a merged representation of signals from the two sensors, wherein in particular the merged representation comprises a representation in incorrect colors, and wherein, in particular, the representation in incorrect colors is due to a sensor which is sensitive in the infrared range, preferably in the long wave infrared range (FIR). The additional display is, for example, arranged in the cockpit of the vehicle, for example at a position which is customary for a combination instrument, or else in the center console of the vehicle. It is preferred here that one of the sensors or sensor systems be provided as a camera (or group of cameras) which is sensitive to visible light and have a higher resolution than another of the sensors or sensor systems which is provided, in particular, as an infrared sensor with a lower resolution (for example for reasons of cost). As a result it is advantageously possible that a maximum gain of information which can be evaluated by the driver assistance device can be obtained from the sensor signals with comparatively low expenditure and at a comparatively low cost. In particular it is advantageously possible that in the case of representation in incorrect colors, in particular of the infrared sensor signal, the sensor signals are displayed in a brightly colored (that is to say multicolored) fashion.

A further subject matter of the present invention relates to a method for visualizing the surroundings of a vehicle, wherein at least two sensors sense the surroundings of the vehicle in order to generate attentiveness information, wherein data which is supplied by the at least two sensors is merged, and wherein the attentiveness information is displayed in a restrictedly contact-analogous fashion in the region of the front windshield by means of a display device. As a result it is advantageously possible for a large gain in safety to be achieved for the driver using simple means.

The invention is explained in more detail below with reference to exemplary embodiments which are illustrated in the drawing.

Figure 2:
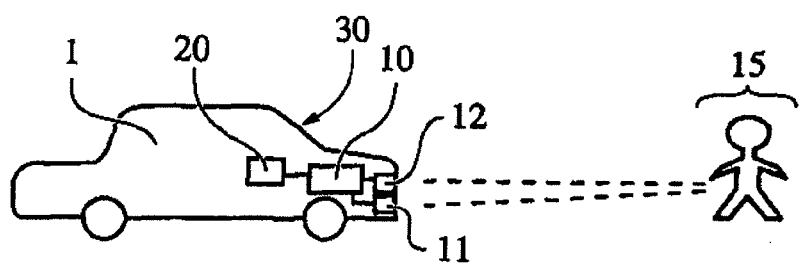

In said drawing:

FIG. 1 is a schematic view of the arrangement of a driver assistance device according to the invention in a vehicle, wherein a plurality of possibilities for displaying attentiveness information or information which is to be displayed are indicated, and FIG. 2 shows a schematic illustration of a vehicle with installed driver assistance device and an object to be detected which is located in front of the vehicle.

FIG. 1 is a schematic illustration of the windshield 30 or the front windshield 30 of a vehicle 1, with the vehicle 1 comprising a driver assistance device 10 according to the invention and a display device 20. The driver assistance device 10 makes it possible to relieve the driver when visibility is poor, in the dark, when he is dazzled or even when there is fog.

For this purpose, according to a first embodiment, at least two sensors 11, 12, which each comprise, in particular, a camera or camera systems, are provided and they sense the surroundings of the vehicle 1. In this context, a video image of the surroundings of the vehicle 1 is generated by means of a first sensor 11. This relates, in particular, to the visible spectral range. An image processing system (not illustrated), which can be arranged, for example, in the driver assistance device 10 or else can merely be assigned to the driver assistance device 10, optionally analyzes the image which is made available by the first sensor 11 or the second sensor 12 and the data supplied by the sensors 11, 12 and marks, for example, people or animals in order to indicate possibly dangerous situations to the driver in good time. According to the invention it is possible to provide that the signals of the sensors 11, 12 are superimposed (merged) to form one image. In this context it is particularly advantageously provided according to the invention that the first sensor 11 (or first sensor system 11) is sensitive, for example, in the visible and/or in the near infrared wavelength range, and that the second sensor 12 (or the second sensor system 12) is sensitive in the near and/or far infrared wavelength range (FIR). By using the signals from both sensors 11, 12, which preferably operate in different wavelength ranges, the image quality of the image which is taken of the surroundings of the vehicle 1 and the variety of functions which are used compared to a system which only uses one type of sensor are considerably improved. According to the invention, the two sensors 11, 12 or sensor systems 11, 12 have different resolutions. This is to be understood, in particular, as meaning that the angular range or the spatial angular range which corresponds to one pixel of the corresponding sensor 11, 12 is of different sizes.

According to a second embodiment, at least one sensor, in particular a camera, is provided which senses the surroundings of the vehicle 1. It is also quite particularly preferred according to the second embodiment that at least two sensors sense the surroundings of the vehicle 1, wherein, in particular, a video image of the surroundings of the vehicle 1 is generated by means of at least one of the sensors. An image processing system analyzes the image which is made available by the sensor (or the sensors) which can, in particular, comprise a multiplicity of cameras, and said image processing system marks, for example, people or animals in order to indicate possibly dangerous situations to the driver in good time. According to the invention, it is particularly preferred that at least two sensors or two sensor systems 11, 12 are provided and their signals are superimposed (merged) to form one image. In this context, according to the invention it is particularly advantageously provided that one 11 of the sensors (first sensor or first sensor system 11) is sensitive, for example, in the visible wavelength range and in the near infrared wavelength range, and that the second sensor 12 (or the second sensor system 12) is sensitive in the far infrared wavelength range (FIR). As a result of the advantageous superimposition of the signals from at least two sensors, which preferably operate in different wavelength ranges, the image quality of the image which is taken of the surroundings of the vehicle 1 and the variety of functions which are used in comparison to a system which only uses one type of sensor are considerably improved.

According to the invention, in both embodiments there is provision that the driver assistance device 10 is connected to a display device 20, or that the display device 20 is connected to the driver assistance device 10 or is assigned to it. By means of the display device 20 it is then possible according to the invention to display what is referred to as attentiveness information 13 or a single item of attentiveness information 13 and/or a graphic representation 14, in particular on or in the front windshield 30. Such attentiveness information 13 is according to the invention not a realistic image or not a realistic detail of an image (in contrast to the graphic representation) of the image of the surroundings of the vehicle 1 which is acquired or viewed by the sensors 11, 12 but rather pictograms or a cartoon-like representation or else merely a luminous marking, such as for example a luminous bar or a luminous spot which is displayed in the region of the front windshield 30 of the vehicle 1. In this context, the display device 20 may be provided, for example, as a spot light source, for example a laser, whose light beam is deflected, for example by a scanner, to the corresponding position on the windshield or the front windshield 30 or to some other location such as, for example, the cockpit or the center console, and can therefore mark a region, in particular on the front windshield 30.

This can be done taking into account the position of the driver's head, which position can be acquired with a camera or a device for determining the position of the driver's head. For this purpose, such a camera or such a device (not illustrated) for determining the position of the driver's head is assigned to the display device 20 so that the precise position of the image of the spot light source or the precise position of the pictogram or the display of the attentiveness information 13 and/or the graphic representation 14 on the display device 20 and/or on the front windshield 30 of the vehicle 1 is adapted. Such a device for determining the position of the driver's head can, for example, be embodied as a simple, low-resolution camera as a component of the projection combination instrument, which camera is provided for adapting the field of vision. It is possible to provide, as an alternative or additionally present embodiment of a display device 20 according to the invention for displaying attentiveness information 13 in the region of the front windshield 30, that a light band, composed of a large number of individual actuable spot light sources, is provided around the edge of the windshield. By suitably activating such individual spot light sources it is possible to attract the driver's attention to a region of the windshield or of the front windshield 30 in which the driver should see the detected object.

Furthermore, FIG. 1 illustrates an additional display 31 or a further possibility 31 of a display device 20 or of a part thereof, on which attentiveness information 13 and/or a graphic representation 14 of at least part of the surroundings of the vehicle 1 can be presented. The additional display 31 is optionally provided. Attentiveness information 13 can, on the one hand, be displayed on the additional display 31 (or further possibility 31 of a display device 20, as on the front windshield 30). As an alternative for this (in particular according to the first embodiment), in addition to the attentiveness information 13 it is also possible to present the graphic representation 14 on the additional display 31, in which case said graphic representation 14 is provided as a merged display based on signals from the first sensor 11 or sensor system and on signals from the second sensor 11 or sensor system. In this context, according to the invention, in particular the display of the signals of the infrared sensor (second sensor 12) involves representation in incorrect colors using one or more bright colors (that is to say not black and white), for example blue and yellow, depending on the intensity of the signal made available by the second sensor 12. Here, by using, in this example, two bright colors it is possible to display different temperature ranges (which correspond to different intensity levels of the signal received from the second sensor 12) in different ways in the illustration on the display device 20. Therefore, a threshold value behavior is obtained between these two temperature ranges or intensity ranges. As a result it is possible to characterize temperature ranges of particular interest by means of a particularly striking colored display.

FIG. 1 illustrates three different possibilities for attentiveness information 13 on or at the edge of the windshield or front windshield 30, for example also for the further possibility 31 or arrangement 31 of the display device 20. In the upper right-hand region of the front windshield 30, the attentiveness information 13 is displayed at its outer edge or in the peripheral region of the edge of the front windshield 30 using flashing or generally illuminated regions of a luminous band.

In this context, a plurality of luminous elements 131, 132 (lit for example by means of LED) are illustrated, and only some of them are illuminated. The illuminated part of the luminous elements 131, 132 indicates the location or the sector of the windshield 30 at which the object which the sensors 11, 12 or the evaluation means within the driver assistance device 10 classify as safety-related or critical for safety is located, so that the display is provided in the region of the windshield or in the region of the front windshield 30 in accordance with the invention. A further possibility for attentiveness information 13 is to display cartoon-like images or pictograms, in which case, for example, it is possible to display whether the system believes it has detected a pedestrian or some other risk. For example, if a pedestrian is detected it is possible to display a pictogram of a pedestrian or of a small person, and if there is a danger or situation which is critical for safety which cannot be assigned a corresponding road sign or a pictogram of a road sign can be displayed. Alternatively to this it is also possible for merely a luminous spot (not illustrated), a round illuminated region or some other rectangular or triangular region or differently shaped region which illuminates the front windshield 30 (or alternatively also the further possibility 31 of a display device 20) to be displayed as attentiveness information 13. Such a region may be displayed, for example, by means of a deflection scanner as display device 20.

The design of the driver assistance device 10 or its arrangement in a vehicle 1 is illustrated schematically in FIG. 2. The driver assistance device 10 is connected to the sensors 11, 12, and/or the sensors 11, 12 are assigned to the driver assistance device 10. Furthermore, the display device 20 is assigned to the driver assistance device 10 so that the attentiveness information 13 can be displayed on the front windshield 30 of the vehicle 1, or the attentiveness information 13 and/or the graphic representation 14 can be displayed. If an object 15, for example a pedestrian, is detected by the sensors 11, 12 or by the evaluation software which is assigned to the sensors 11, 12 or the driver assistance device 10, a corresponding signal is transmitted from the driver assistance device 10 to the display device 20 in order to display the attentiveness information 13 and/or the graphic representation 14, as explained in conjunction with FIG. 1. For this purpose it is, on the one hand, possible that only one type of attentiveness information 13 can be displayed, in particular on the front windshield 30, or it is possible that both a pictogram, or a cartoon-like representation as attentiveness information 13, and in addition a luminous marking, for example in the peripheral region of the front windshield 30, are displayed as attentiveness information 13. According to the invention it is possible to provide that an object detection process, for example of pedestrians or of other vehicles, is carried out and when an object is detected a corresponding display is produced on the display device 20 or the additional display 31. In this context the object detection process is based either on the signal from an infrared sensor (or from an infrared camera) or on the signal from a sensor which is sensitive in the visible spectral range of light or else on the signals from both sensors (wherein, in particular, the sensor data is merged). Further information which can be used in the object detection process for predicting the potential for danger from objects located in the surroundings of the vehicle comprises the data from a navigation system which is arranged in the vehicle and/or the data from an onboard computer which is arranged in the vehicle and/or information relating to the steering angle and/or information relating to the activity state of a flashing indicator light and/or information relating to an activity of an ABS system (antilock brake system) and/or information relating to a yaw rate of the vehicle and/or information relating to the velocity of the vehicle.

According to the invention there is preferably provision that the sensors 11, 12 and, if appropriate, an active infrared lighting system (in particular in the near infrared range) are mounted in or on the roof bracket, in or on the windshield or in or on the rear view mirror of the vehicle. In this case, the material of the windshield, for example glass or plastic, is made correspondingly transparent, at least in the region in which it is necessary for the radiation (in particular infrared radiation) to be transmitted. If appropriate, in this case the sensor is to be provided with protection (for example a shutter which is separated by means of a brightness signal) for comparatively intensive irradiation by light (for example in daylight).

LIST OF REFERENCE NUMERALS

1 Vehicle
10 Driver assistance device
11 First sensor/first sensor system
12 Second sensor/second sensor system
13 Attentiveness information
14 Graphic representation
15 Object
20 Display device
30 Front windshield
31 Additional display/further possibility for a display device
131,132 Luminous elements

The invention claimed is:

1. A driver assistance device for a vehicle comprising:
at least two sensors for sensing surroundings of the vehicle, wherein the at least two sensors sense different spectral ranges relative to one another; wherein a first sensor of the at least two sensors is sensitive both in a range of visible light and in a range of near infrared light, wherein a second sensor of the at least two sensors senses in a range of infrared light, wherein a second sensor of the at least two sensors has a lower resolution than a first sensor of the at least two sensors;
a display device configured to display attentiveness information in a region of a front windshield of the vehicle and at least one of in a region of a cockpit of the vehicle and in a region of a center console of the vehicle, wherein the attentiveness information comprises a cartoon-like display, wherein the display device displays the attentiveness information in a restrictedly contact-analogous fashion; and
a device for determining a position of a driver's head, a position of the driver's eyes, and a movement of the driver's eyes,
wherein a location of the attentiveness information is dependent on the position of the driver's head.

2. The driver assistance device as claimed in claim 1, wherein the at least two sensors have different resolutions relative to one another.

3. The driver assistance device as claimed in claim 1, wherein the display device is configured to provide a headup display in a region of the front windshield.

4. The driver assistance device as claimed in claim 1, wherein the display device is configured to display a graphic representation of at least part of the surroundings of the vehicle.

5. The driver assistance device as claimed in claim 1, wherein, in order to extract the attentiveness information, data supplied by a sensor of the at least two sensors is processed or data supplied by the at least two sensors is merged.

6. The driver assistance device as claimed in claim 1, wherein the attentiveness information comprises distance information.

7. The driver assistance device as claimed in claim 1, wherein the attentiveness information comprises a luminous marking in a peripheral region of the front windshield.

8. The driver assistance device as claimed in claim 4, wherein the graphic representation comprises a display of data supplied by one sensor of the at least two sensors or the graphic representation comprises a merged display of data supplied by the at least two sensors.

9. The driver assistance device as claimed in claim 4, wherein the graphic representation comprises a representation in incorrect colors due to a sensor of the at least two sensors.

10. A driver assistance device for a vehicle comprising:
   two sensors sensing different spectral ranges relative to one another, wherein a first sensor of the two sensors is sensitive both in a range of visible light and in a range of near infrared light;
   a display device configured to display attentiveness information in a restrictedly contact-analogous fashion in a region of a front windshield of the vehicle and at least one of in a region of a cockpit of the vehicle and in a region of a center console of the vehicle, wherein the attentiveness information comprises a cartoon-like display; and
   a device for determining a position of a driver's head, a position of the driver's eyes, and a movement of the driver's eyes,
   wherein a location of the attentiveness information is dependent on the position of the driver's head.

11. The driver assistance device as claimed in claim 10, wherein the two sensors sense surroundings of the vehicle, wherein data supplied by the two sensors is merged to extract the attentiveness information.

12. The driver assistance device as claimed in claim 10, wherein the attentiveness information comprises a display projected into the region of the front windshield.

13. The driver assistance device as claimed in claim 10, wherein the attentiveness information further comprises a luminous marking in a peripheral region of the front windshield.

14. The driver assistance device as claimed in claim 10, wherein the display device comprises a headup display.

15. The driver assistance device as claimed in claim 10, wherein the attentiveness information comprises distance information.

16. The driver assistance device as claimed in claim 10, wherein the spectral ranges comprise at least one of in a range of visible light, in a far infrared range, and in a near infrared range.

17. The driver assistance device as claimed in claim 10, further comprising an additional display, wherein the additional display displays a graphic representation of at least part of surroundings of the vehicle.

18. The driver assistance device as claimed in claim 17, wherein the graphic representation corresponds to a merged representation of signals from the two sensors, wherein the merged representation comprises a representation in incorrect colors, and wherein the representation in incorrect colors is due to a sensor which is sensitive in an infrared range.

19. A method for visualizing surroundings of a vehicle comprising:
   sensing surroundings of the vehicle with at least two sensors in order to generate attentiveness information, wherein the at least two sensors sense different spectral ranges relative to one another, wherein a first sensor of the at least two sensors is sensitive both in a range of visible light and in a range of near infrared light;
   displaying the attentiveness information in a restrictedly contact-analogous fashion with a display device in a region of a front windshield of the vehicle and at least one of in a region of a cockpit of the vehicle and in a region of a center console of the vehicle, wherein the attentiveness information comprises a cartoon-like display;
   determining a position of a driver's head, a position of the driver's eyes, and a movement of the driver's eyes; and
   determining a location of the attentiveness information dependent on the position of the driver's head.

20. The driver assistance device as claimed in claim 1, wherein the at least two sensors are in or on a roof bracket, in or on a windshield or in or on a rear view mirror of the vehicle.

21. The driver assistance device as claimed in claim 18, wherein the representation in incorrect colors is due to a sensor which is sensitive in a long wave infrared range, wherein the two sensors have different resolutions.

22. The method of claim 19, further comprising merging data supplied by the at least two sensors.

* * * * *